United States Patent Office 3,528,834
Patented Sept. 15, 1970

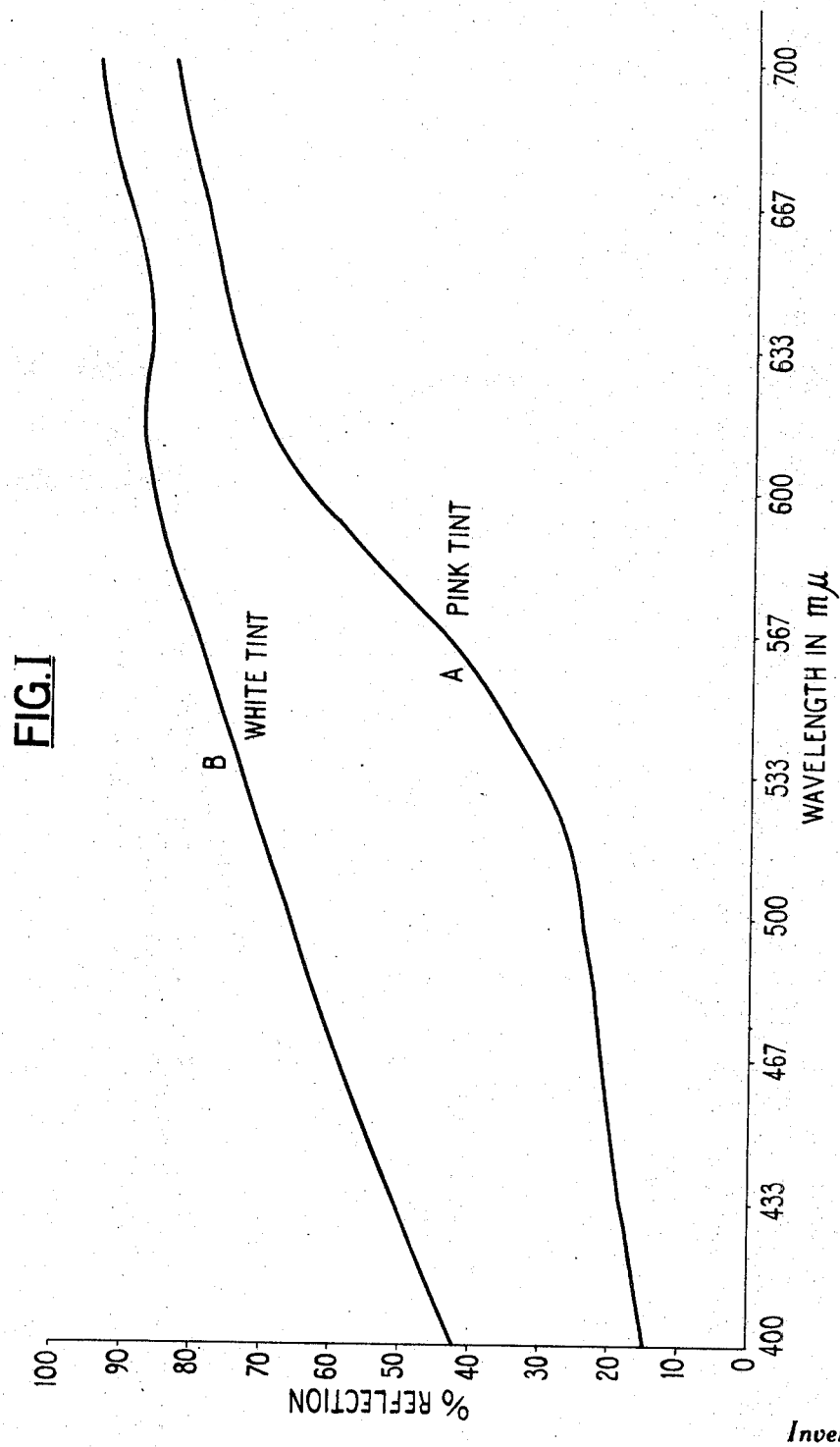

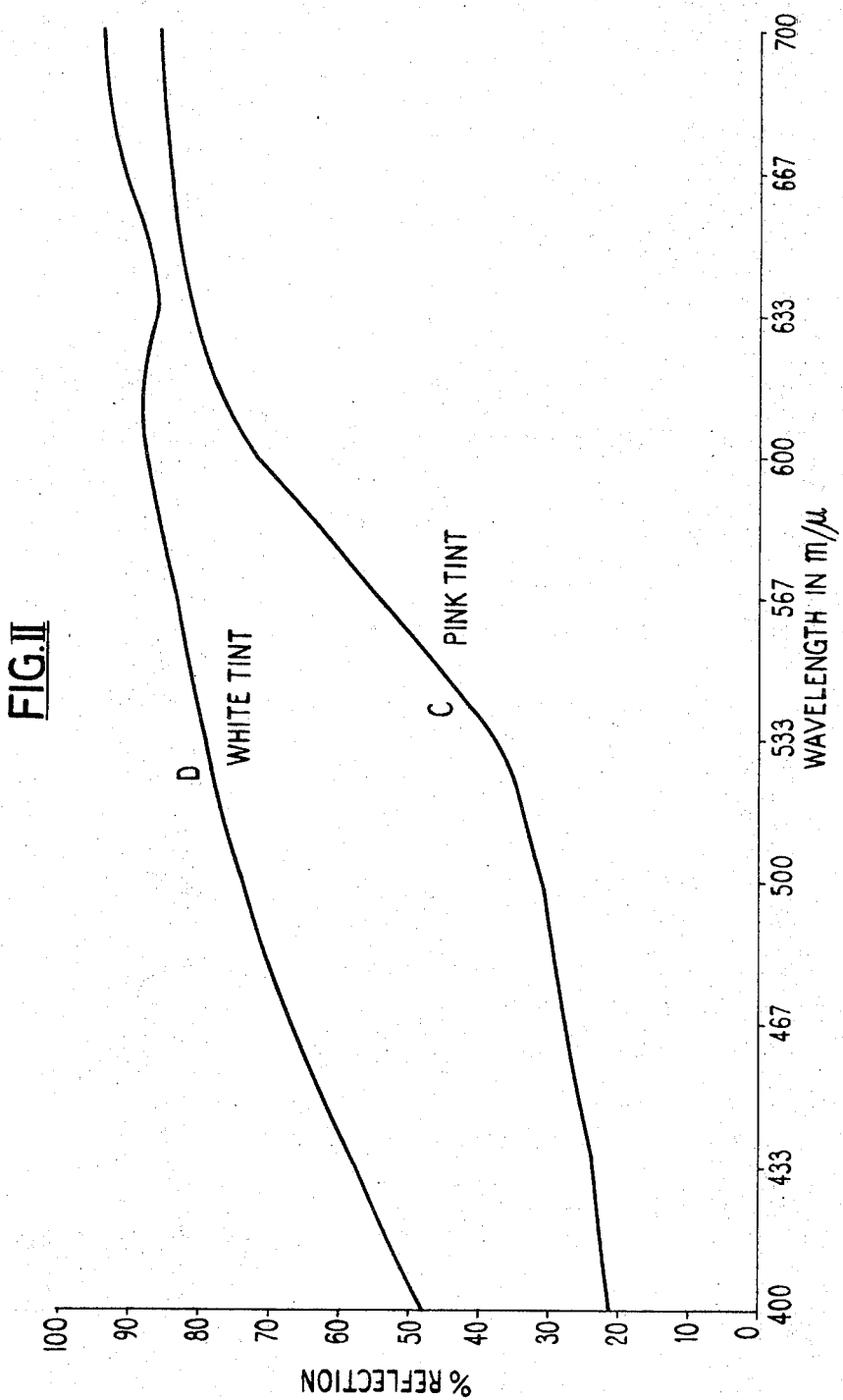
FIG. II

3,528,834
PRODUCTION OF ZIRCONIUM-BASED CERAMIC PIGMENTS CONTAINING IRON
Joseph Gascon, Thann, France, assignor to Fabriques de Produits Chimiques de Thann et de Mulhouse, Thann, France, a French body corporate
Filed July 19, 1967, Ser. No. 654,527
Int. Cl. C09c *1/00, 1/22*
U.S. Cl. 106—299                                 8 Claims

ABSTRACT OF THE DISCLOSURE

Pink ceramic pigments based on zirconium and containing at least 7% by weight of iron can be made by calcining at 700–950° C. a mixture containing a basic zirconium sulphate, enough ferrous sulphate to produce the iron content required, sodium silicozirconate and silica, and subsequently removing sodium sulphate from the product by washing.

---

This invention relates to the preparation of ceramic pigments based on synthetic zircon and strongly coloured by iron contained therein.

British specification No. 986,751 described a ceramic pigment comprising an iron-containing zircon crystal lattice. The pigment is described as being produced by calcining a mixture of at least one compound capable of yielding iron oxide, a source of alkali metal ions and a source of fluoride ions, and, preferably also a source of chloride or bromide ions. The iron compound is preferably added in the form of an aqueous solution of ferrous sulphate or ferric chloride to a mixture of zirconium oxide, silica and alkali halides including the fluoride. The mixture obtained is dried and then calcined in the absence of air.

The colouring power of such a pigment, which is of value in glazes, depends on the percentage of iron fixed in the lattice of the synthetic zircon. However the degree of penetration of iron remains relatively low (about 20 to 25% in the most favourable cases), and in order to obtain a strongly coloured pink pigment it might be considered necessary to use large doses of iron. However, if the process of Example 1 of specification No. 986,751 is repeated, but with an iron content (Fe) of more than 7%, an unfavourable result is obtained as demonstrated below.

FIG. 1 gives the spectrophotometric curves of two glazed colours on a faience base (cone 02).

Curve A is that obtained with a zircon-iron pigment containing 5.8% of iron, introduced in the form of $$FeSO_4 \cdot 7H_2O.$$

Curve B is that obtained with zircon-iron pigment containing 7.7% of iron, also introduced in the form of $FeSO_4 \cdot 7H_2O$. As can be seen from these curves the colouration in the second glaze due to iron is practically nil. The high proportion of sulphate used in the calcination mixture for the second pigment thus has the effect of neutralising the mineralising action of the halides during the calcination.

The use of fluorides as mineralising agents in the synthesis of zircon has been known for a long time (see, for example, the work of Blumenthal "The Chemical Behaviour of Zirconium," page 219).

When a high proportion of ferrous sulphate is used in this type of composition, the addition of some sodium sulphate can ensure an improved mineralising effect. This can be demonstrated as follows:

Two pigments were prepared in accordance from the following mixtures:

|  | (1) (g.) | (2) (g.) |
|---|---|---|
| Zirconium oxide | 63 | 63 |
| Silica | 31 | 31 |
| Sodium fluoride | 3 | 3 |
| Ferrous sulphate heptahydrate | 40 | 40 |
| Anhydrous sodium sulphate | | 35 |

The calcinations were carried out in a closed crucible at about 860° C. The products were afterwards washed and ground for use in an enamel.

FIG. II gives the colour curves obtained after stoving on to faience tiles (cone 02). Curves D and C represent the pigments obtained according to formulations (1) and (2) respectively; they show the effect of the sodium sulphate on the development of the colour.

The present invention relates to the preparation of intense pink ceramic pigments which contain at least 7% by weight (expressed as iron) after calcination and washing. In accordance with the invention such pigments are obtained by calcining at 700 to 950° C., preferably in the absence of air, a mixture containing a zirconium sulphate compound of general formula $xSO_3 \cdot yZrO_2 \cdot nH_2O$, wherein the ratio $x:y$ is approximately 1:2, and $n$ corresponds to a water content after oven drying of about 20% (preferably a basic sulphate of formula $SO_3 \cdot 2ZrO_2 \cdot nH_2O$, especially that prepared as described in British application No. 26,843/64, now U.K. Patent No. 1,060,223); ferrous sulphate; sodium silicozirconate and silica.

The components of the calcination mixture form sodium sulphate which, as described above, acts as a mineralising agent and aids the formation of the pink zircon pigment. It can subsequently be removed readily from the reaction mixture by washing.

The amount of silicia added is preferably such that the equimolar ratio of $SiO_2$ to $ZrO_2$ in the calcination mixture is such as is required to form the zircon lattice. The amount of ferrous sulphate should be such that a total amount of iron of more than 7% (expressed as Fe preferably 7.3 to 10.5%) is obtained in the pigment produced after calcination and washing. The amount of silicozirconate used in the mixture is determined by that of the ferrous sulphate and that of the zirconium sulphate compound.

Reactions which take place upon calcination are the following:

$$SiO_2 \cdot ZrO_2 \cdot Na_2O + FeSO_4 \rightarrow Na_2SO_4 + SiO_2 + ZrO_2 + FeO$$

$$SiO_2 \cdot ZrO_2 \cdot Na_2O + SO_3 \cdot 2ZrO_2 + 2SiO_2 \rightarrow$$
$$3ZrO_2 + 3SiO_2 + Na_2SO_4$$

Preferably the calcination mixture comprises also a source of fluoride ions such as an alkali metal fluoride, a double fluoride or a complex fluoride such as an alkali metal fluosilicate. By using a source of fluoride ions an improved mineralising effect is achieved which is due to the powerful mineralising effect of silicon fluoride, produced in situ by reaction between fluoride ion and silica contained in the calcination mixture.

The source of fluoride ions which is needed for the formation of the silicon fluoride is preferably incorporated in the zirconium sulphate. Thus it may be dispersed in wet basic sulphate in the form of sodium fluoride. Penetration of the fluoride ion into the zirconium compound by complex formation takes place when the latter is dried at 100–110° C. The amount of fluoride ion used preferably corresponds to 1 to 3% by weight of fluorine relative to the total of silica and zirconia.

In a preferred method, the ferrous sulphate is dissolved in water to give a concentrated solution, which is then added to a mixture of basic zirconium sulphate, which has been dried after the addition of the source of fluoride ions, the sodium silicozirconate and the silica. The damp mass is then dried at 100 to 110° C., ground and calcined in a closed crucible at about 860° C. The calcined product, after washing with water to remove sodium sulphate, followed by grinding, is a pink pigment which may be used in ceramic glazes or facings.

The following example will serve to illustrate the invention.

EXAMPLE 2 g. of sodium fluoride were dispersed in 86 g. of basic zirconium sulphate containing 35% of $ZrO_2$. The damp mass was dried in an oven at 110° C. for 5 to 6 hours and was then finely ground (to a size passing a Tyler 100 sieve).

40 g. of ferrous sulphate heptahydrate were dissolved in 33 cc. of boiling water and the solution was poured into a mixture comprising: the whole of the previously treated basic sulphate, 62 g. of sodium silicozirconate (particle size corresponding to passage through a Tyler 100 sieve) and 15 g. of micronized quartz, of particle size at most 10μ.

The resultant damp mass was mixed thoroughly and then dried in an oven at 110° C. for 2 to 3 hours. The mass obtained was ground in a ball mill and then calcined in an electrically heated muffle furnace within a covered crucible. The temperature was raised to 860° C. and maintained for 1½ hours. The calcination product was washed twice with water to extract the sodium sulphate produced.

The coloured mass was ground in a pebble mill to reduce it to a suitable fineness. The pigment obtained was filtered and then dried. When used as a glaze on "cone 02" faience in amounts of 5% it produced a deep pink tint.

I claim:

1. A process for the production of a pink ceramic pigment based on zirconium which comprises calcining at 700–950° C. a mixture containing a zirconium sulphate compound of general formula $xSO_3yZrO_2nH_2O$ wherein the ratio $x:y$ is approximately 1:2 and $n$ corresponds to a water content after oven drying of about 20%, ferrous sulphate in an amount not in excess of that which will give a pink color to the pigment but sufficient to provide at least 7% by weight iron in the pigment, sodium silicozirconate and silica being such as to provide a mole ratio $SiO_2:ZrO_2$ of substantially 1:1 in the mixture to be calcined, and washing the calcined product to remove sodium sulphate.

2. A process according to claim 1, wherein the mixture is calcined in the substantial absence of air.

3. A process according to claim 2, wherein the sodium silicozirconate has the formula $Na_2O.ZrO_2.SiO_2$.

4. A process according to claim 1, wherein the calcination mixture contains also a source of fluorine ions.

5. A process according to claim 2, wherein the calcination mixture contains also a source of fluorine ions.

6. A process according to claim 5, wherein the source of fluorine ions is an alkali metal fluoride, double fluoride or complex fluoride incorporated in the zirconium sulphate.

7. A process according to claim 2, wherein a concentrated aqueous solution of the ferrous sulphate is added to a mixture of basic zirconium sulphate which has been dried after being impregnated with a source of fluorine ions, the sodium silicozirconate and the silica, and the resulting damp mass is dried at 100–110° C., ground, calcined in the absence of air, washed with water and ground.

8. A process according to claim 1 wherein the amount of ferrous sulphate used is sufficient to provide 7–10.5% by weight iron in the pigment.

References Cited

UNITED STATES PATENTS

| 3,166,430 | 1/1965 | Seabright | 106—299 |
| 3,189,475 | 1/1965 | Marquis et al. | 106—299 |
| 3,300,414 | 1/1967 | Meyer-Simon et al. | 106—299 XR |

FOREIGN PATENTS 996,034   6/1965   Great Britain.

TOBIAS E. LEVOW, Primary Examiner

H. M. S. SNEED, Assistant Examiner

U.S. Cl. X.R.

106—304

UNITED STATES PATENT OFFICE

CERTIFICATE OF CORRECTION

Patent No. 3,528,834　　　　　　　　　　Dated September 15, 1970

Joseph Gascon

Assignor to Fabriques de Produits Chimiques
de Thann et de Mulhouse, Thann, Haut-Rhin
France It is certified that error appears in the above identified patent and that said Letters Patent are hereby corrected as shown below:

In the heading of Column 1, following the line reading
"Filed July 19, 1967, Ser. No. 654,527", read:
-- Claims priority, applications France,
December 28, 1964, No. 64, and United Kingdom,
July 22, 1966, No. 33,101 --

Column 1, before line 30, the following paragraph is inserted:
-- This application is a continuation-in-part of my copending application Serial No. 524,996, filed December 23, 1965, now abandoned, of which my copending application Serial No. 831,781, filed June 9, 1969, is another continuation-in-part. --

Signed and sealed this 19th day of October 1971.

(SEAL)
Attest:

EDWARD M. FLETCHER, JR.　　　ROBERT GOTTSCHALK
Attesting Officer　　　　　　Acting Commissioner of Patents